United States Patent
Boufounos et al.

(10) Patent No.: US 9,251,436 B2
(45) Date of Patent: Feb. 2, 2016

(54) METHOD FOR LOCALIZING SOURCES OF SIGNALS IN REVERBERANT ENVIRONMENTS USING SPARSE OPTIMIZATION

(71) Applicant: Mitsubishi Electric Research Laboratories, Inc., Cambridge, MA (US)

(72) Inventors: Petros T Boufounos, Boston, MA (US); Jonathan Le Roux, Somerville, MA (US); Kang Kang, Sallas, TX (US); John R Hershey, Winchester, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 485 days.

(21) Appl. No.: 13/776,850

(22) Filed: Feb. 26, 2013

(65) Prior Publication Data

US 2014/0244214 A1    Aug. 28, 2014

(51) Int. Cl.
*H03F 1/26* (2006.01)
*G06K 9/62* (2006.01)
*G01S 3/802* (2006.01)

(52) U.S. Cl.
CPC ............... *G06K 9/6244* (2013.01); *G01S 3/802* (2013.01); *G06K 9/6249* (2013.01)

(58) Field of Classification Search
CPC ..... G06K 9/6244; G06K 9/6249; G01S 3/802
USPC ........................................... 702/189
See application file for complete search history.

(56) References Cited

U.S. PATENT DOCUMENTS

| | | | |
|---|---|---|---|
| 7,130,797 B2 | 10/2006 | Beaucoup et al. | |
| 8,233,353 B2 | 7/2012 | Zhang et al. | |
| 2011/0317522 A1* | 12/2011 | Florencio et al. | 367/129 |
| 2013/0107667 A1* | 5/2013 | Boufounos | 367/99 |
| 2014/0099901 A1* | 4/2014 | Ruegamer et al. | 455/67.13 |

* cited by examiner

*Primary Examiner* — Tung S Lau
*Assistant Examiner* — Xiuquin Sun
(74) *Attorney, Agent, or Firm* — Dirk Brinkman; Gene Vinokur

(57) ABSTRACT

Source signals emitted in a reverberant environment from different locations are processed by first receiving input signals corresponding to the source signals by a set of sensors. Then, a sparsity-based support estimation is applied to the input signals according to a reverberation model to produce estimates of the source signals and locations of a set of sources emitting the source signals.

16 Claims, 2 Drawing Sheets initialize
  Iteration count $l = 0$,
  Initial signal estimate $\hat{\mathbf{X}}^l(\omega) = (0)$, for all $\omega$
  Initial support estimate set $S^l = \emptyset$.
while not converged do
  Increase iteration count: $l \leftarrow l + 1$
  Compute residual: $\mathbf{R}(\omega) = \mathbf{Y}(\omega) - \mathbf{A}(\omega)\hat{\mathbf{X}}^{l-1}(\omega)$, for all $\omega$ — 210
  Compute gradient: $\mathbf{G}^l(\omega) = \mathbf{A}^H(\omega)\mathbf{R}(\omega)$ — 220
  Compute proxy: $\mathbf{p} = E(\mathbf{G}^l)$ {as in (7)} — 230
  Identify support candidate: $\mathcal{T}^l = T(\mathbf{p}, 2K) \cup S^{l-1}$ — 240
  Invert over support: $\mathbf{B}^l(\omega) = \mathbf{A}^\dagger_{\mathcal{T}}(\omega)\mathbf{Y}(\omega)$ for all $\omega$ — 250
  Compute final support: $S^l = T(E(\mathbf{B}^l), K)$ — 260
  Truncate and update estimate: $\hat{\mathbf{X}}^l(\omega) = \mathbf{B}^l(\omega)|_{S^l}$ — 270
end while
return Signal estimate $\hat{\mathbf{X}}^l(\omega)$, support estimate $S^l$. — 209

*Fig. 2*

METHOD FOR LOCALIZING SOURCES OF SIGNALS IN REVERBERANT ENVIRONMENTS USING SPARSE OPTIMIZATION

FIELD OF THE INVENTION

This invention relates generally to signal processing, and more particularly to localizing sources of signals in reverberant environments.

BACKGROUND OF THE INVENTION

Compressive Sensing and Sparse Models

Compressive sensing (CS) and sparse models provide theories and tools for signal acquisition and signal processing applications. A sparse model assumes that a signal, when transformed to an appropriate basis, has very few significant coefficients that model signal energy. Promoting sparsity in some appropriate domain is a very efficient computational method to capture the structure of most natural and manmade signals processed by modern signal processing systems.

Sparsity is useful when inverting an undetermined linear system of the form $$y = Ax, \quad (1)$$

where y is an M-dimensional measurement vector, A is a mixing matrix, and x is an N dimensional sparse signal vector. For the underdetermined system, the following optimization determines a sparsest solution $$\bar{x} = \arg\min_x \|x\|_0 \text{ s.t. } y \approx Ax, \quad (2)$$

where an $l_0$ norm counts the number of non-zero coefficients of the signal vector x. This is a combinatorially complex problem. Under certain conditions on the mixing matrix A, a solution is possible in polynomial time using a convex relaxation of the $l_0$ norm, or a number of available greedy procedures. These include orthogonal matching pursuit (OMP), Compressive Sampling Matching Pursuit (CoSaMP), Subspace Pursuit (SP), and iterative hard thresholding (IHT) procedures.

Joint and group sparsity models, and their variations, provide further structure to the signal of interest. Joint sparsity can be considered as a special case of group sparsity, thus only the latter is described herein. Under this model, the signal coefficients are partitioned into groups $G_j$, which partition the coefficient index set $\{1, \ldots, N\}$. The group sparsity model assumes that only a few of these groups contain non-zero coefficients, and most groups contain all-zero coefficients. Group sparsity can also be enforced using a convex optimization problem, or greedy procedures.

In joint sparsity models, multiple sparse signals are measured concurrently. The assumption is that all the signals share the same sparsity pattern. In other words, the significant signal coefficients are located at the same positions for all signals. By considering the whole acquisition as a linear system, these models are a special case of group sparsity models, and a similar approach can determine the sparse output.

Model-based CS enables more complex constraints and structure than typical sparsity or group-sparsity problems. It is possible to modify conventional methods, such as CoSaMP, to enforce model-based sparsity. All that is necessary is a model-based thresholding function, which replaces the conventional thresholding function, and truncates the signal according to the model.

SUMMARY OF THE INVENTION

The embodiments of the invention provide a method for localizing sources of signals in reverberant environments. By formulating the localization problem in a frequency domain, the method can efficiently incorporate information that exploits the reverberation instead of considering it a nuisance to be suppressed.

In this formulation, localization becomes a joint-sparsity support recovery problem, which is solved using a model-based method. Also provided is a sparse location model, which further improves performance.

The method can recover more sources that the number of sensors. In contrast to conventional approaches, the method considers that reverberation is beneficial in source localization, as long as it is known and properly accounted for.

BRIEF DESCRIPTION OF THE DRAWINGS

FIG. 2 is a block diagram of pseudo code of modified joint-sparsity CoSaMP procedure used by the method of FIG. 1.

DETAILED DESCRIPTION OF THE PREFERRED EMBODIMENTS

Figure 1:
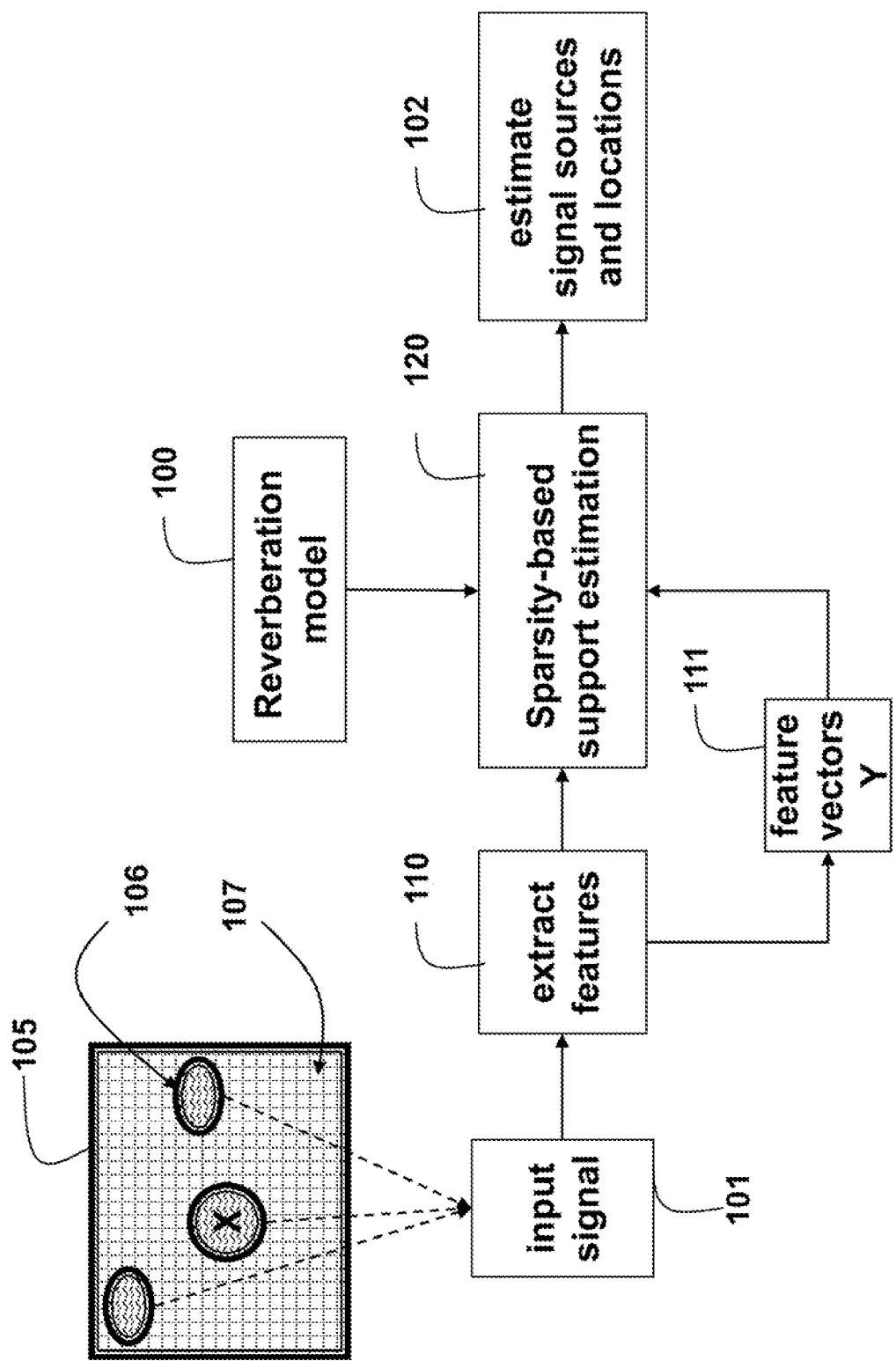
FIG. 1 is a flow diagram of a method for localizing sources of signals in a reverberant environment using sparse optimization according to embodiments of the invention.

As shown in FIG. 1, embodiments of our invention provide a method for localizing source signals 106 emitted in a reverberant environment 105 using sparse optimization.

Input signals 101 are acquired from the sources by a set of sensors. For example, the signals are acoustic signals and the sensors are microphones. The input signal at each frequency is modeled as a linear combination of all the source signals at that particular frequency. Coefficients in the linear combination correspond to a frequency response of the environment from each location at that frequency.

However, it is understood that other signaling modalities can be used by the embodiments of the invention.

Features extracted 110 from the input signals produce a feature vector 111. The specific features used depend on the signaling modality. In the following we assume that the input signal is usually in the form of a feature vector, although we do not say so explicitly each time.

A sparsity-based support estimation is applied 120 to the input signals according to a reverberation model 100 to produce estimates 102 of the source signals and the locations of the sources.

Reverberation Model

We consider M sensors, each sensor receiving a signal $y_m(t)$, $m=1, \ldots, M$, where t denotes a time index. We discretize the environment 105 to a grid of N locations 107, indexed using $n=1, \ldots, N$. Each of those locations is a potential source emitting a signal $x_n(t)$. This signal is zero when there is no source at that location, and non-zero when a source emits a signal at that location.

In the reverberant environment 105, the signal $x_n(t)$ from each source n arrives at each sensor m via multiple paths. Assuming the sensors are omnidirectional, the contribution of signal $\tilde{x}_{mn}(t)$ from location n of the signal received at sensor m can be represented as a convolution of the source signal at location n with a filter $a_{mn}(t)$, referred to as an impulse response (IR) for that source and sensor:

$$\tilde{x}_{mn}(t) = (a_{mn} * x_n)(t). \quad (3)$$

For acoustic signals, this is a room IR, although other IRs are possible for other signaling modalities. Directionality of the sensors can also be incorporated in the IR $a_{mn}(t)$. Directionality of the sources can also be incorporated by extending the grid to include discretized directions for each location.

If a sampling window for analysis is sufficiently longer than a length of the IR, then this relationship can be well approximated in the frequency domain using a narrowband approximation:

$$\tilde{X}_{mn}(\omega) \approx A_{mn}(\omega) X_n(\omega), \quad (4)$$

where $\omega$ denotes a discretized angular frequency, and $\tilde{X}_{mn}$, $A_{mn}$ and $X_n$ denote discrete Fourier transforms (DFT) of the windowed $\tilde{x}_{mn}$, $a_{mn}$ and $x_n$, respectively.

Summing over the contributions from all potential sources in the environment, we model the signal received at sensor m as:

$$Y_m(\omega) \approx \sum_n A_{mn}(\omega) X_n(\omega), \quad (5)$$

which can be rewritten, for each $\omega$, as a matrix multiplication $$Y(\omega) \approx A(\omega) X(\omega), \quad (6)$$

where the feature vector 111 is $Y(\omega) = [Y_1(\omega), \ldots, Y_M(\omega)]^T$, and the source signal vector is $X(\omega) = [X_1(\omega), \ldots, X_N(\omega)]^T$, where T is a transpose operator.

We assume that the K sources 106 emit broadband signals, and that K is much smaller than the number N of discretized locations 107 in the environment 105. The number of sources K might or might not be known in advance. Furthermore, the number of sources can be different from the number of sensors. Broadband sources emit signals in a wide bandwidth, i.e., $X_n(\omega)$ is non-zero for a wide range of possible angular frequencies $\omega$'s.

The localization problem can be formulated as estimating the support of $X(\omega)$ given the mixing matrix $A(\omega)$, and the acquired signals expressed as the feature vector $Y(\omega)$.

We assume that there are only a small number of sources compared to the total number of discretized locations. Therefore, the vector $X(\omega)$ is sparse, and recovery of the support of $X(\omega)$ can be considered as a compressed sensing problem. Furthermore, this support, or sparsity pattern, is identical for all frequencies $\omega$, or, in other words, the vectors $X(\omega)$ are jointly sparse.

Under the broadband assumption, it is possible to identify the location of more than M sources using M sensors. The significant ambiguities that arise in the single frequency case manifest themselves for different locations at different frequencies. The joint sparsity model exploits these differences to resolve these ambiguities and localize the sources.

Location Model

Even when considering the jointly sparse model, the coherence of columns of the mixing matrix $A(\omega)$ corresponding to neighboring locations can be high. This would impair the recovery and the performance of the system. If two sources are close to each other, then localization and recovery become an ill-conditioned problem. Furthermore, if the discretization of the localization grid is very fine when compared to the coherence pattern of the array, then nearby locations would appear very similar to the location of actual sources. This would confuse the recovery method, and hinder the ability to localize weaker sources.

Fortunately, it is unlikely in practice for two sources to be sufficiently close to each other as measured by the coherence pattern of the sensors. By actively enforcing a location model preventing sources from being too close to each other, the localization performance increases dramatically. This can be performed at each iteration of any greedy procedure whenever a truncation is performed, simply by performing a model-based truncation.

The method enforces a model-based truncation, which ensures that no two identified support locations are close to each other. That is, the model-based truncation enforces constraints on distances between the locations. Given the source signal X, our truncation T(X, K) returns K support locations, greedily starting from the grid location with a maximal total energy for all the frequencies, and in each iteration discarding all other locations in the neighborhood of the selected location before making another selection.

Joint-Sparsity and Model-Based CoSaMP

As described above, the signal $X(\omega)$ only contains at most K non-zero components, which have the same support in all frequencies, i.e., the signal is K-sparse. Under this formulation, localization becomes a joint-support recovery problem, and signal recovery becomes a joint-sparsity recovery problem.

The principles from simple sparsity problems can be transferred to joint sparsity problems when the norms in convex formulations and the truncations in greedy processes are not determined independently on each signal vector, but instead on vectors comprising the energy of each of the groups in the support.

Specifically, in our case, we consider a vector energy function $$(E(X))_n = \sqrt{\sum_\omega |X_n(\omega)|^2}. \quad (7)$$

Minimizing or constraining the $l_0$ norm or the $l_1$ norm of the vector $E(X)$, also known as a mixed $l_0/l_2$ or $l_1/l_2$ norm of X with respect to grouping defined by frequencies $\omega$, subject to $Y(\omega) \approx A(\omega) X(\omega)$ for all frequencies $\omega$ generates solutions with identical support structure, i.e., jointly sparse with respect to the support of each source signal $X(\omega)$.

To determine the joint-sparsity pattern described herein, we can use a variation of model-based CoSaMP procedure as shown in FIG. 2. This method uses a model-based truncation, which operates on the energy signal as described above. This enables us to separate the impact of two different models: the joint-sparsity model and the location model.

In our procedure, an iteration count l, an initial signal estimate $\hat{X}$ and an initial support estimate set S are initialized 201. The procedure iterates over l until convergence. For clarity, superscripts and subscripts are omitted below.

For all frequencies $\omega$, the procedure determines the residual signal $R = Y - AX$ 210 and the gradient as $G = A^H R$ 220, where H represents a Hermitian transpose. The proxy vector p, defined as the energy of the gradient G, is determined 230 according to equation (7).

A support candidate is identified 240 according to $\mathcal{T} = T(p, 2K) \cup S$. A temporary estimate B of the sources over the current support candidate is obtained by inverting 250 the system of equation (6) restricted to the current support candidate, according to $B = A_T^\dagger Y$, where the superscript † denotes a pseudo inverse, and the subscript $T$ indicates that only the columns of A corresponding to the support $T$ are considered. The final support 260 for the current iteration is then obtained according to $S = T(E(B), K)$. The current signal estimate is updated 270 using the truncation of B to the final support, as $\hat{X} = B|_S$.

Upon convergence, the procedure returns 209 the signal estimate $\hat{X}$ and support estimate S.

Alternatively, any greedy or optimization-based joint-sparsity recovery procedure can be used. A greedy method typically solves the optimization problem $$\underset{X(\omega)}{\operatorname{argmin}} \sum_\omega \|Y(\omega) - A(\omega)X(\omega)\|_2 \text{ s.t. } \|E(X(\omega))\|_0 \le K.$$

Similarly, a joint convex optimization procedure can solve the problem $$\underset{X(\omega)}{\operatorname{argmin}} \|E(X(\omega))\|_1 \text{ s.t. } \sum_\omega \|Y(\omega) - A(\omega)X(\omega)\|_2 \le \epsilon,$$

or the problem $$\underset{X(\omega)}{\operatorname{argmin}} \|E(X(\omega))\|_1 + \lambda \sum_\omega \|Y(\omega) - A(\omega)X(\omega)\|_2^2,$$

where K, λ and ε are appropriately determined according to the noise and the number of sources. Additionally a location model can be enforced in any greedy or convex methods.

The procedure can be performed in a processor connected to memory and input/output interfaces as known in the art.

Recovery performance may be improved by using appropriate normalizations of the columns of the matrix $A(\omega)$ in the residual step 210, gradient step 220 and inverse step 250. Specifically, if $A_n(\omega)$ denotes the n-th column of $A(\omega)$, we obtained the optimal performance when using, for the residual and inverse steps, a normalization over frequencies and sensors for each grid position:

$$\tilde{A}_n(\omega) = A_n(\omega)/\sqrt{\sum_{\omega',m} |A_{mn}(\omega')|^2},$$

and, for the gradient step, a normalization over sensors only:

$$A'_n(\omega) = A_n(\omega)/\sqrt{\sum_m |A_{mn}(\omega)|^2}.$$

The method returns both the signal estimate and the location estimate. Under the broadband assumption, it is possible to identify the location of more than M sources using M sensors, although not necessarily reconstruct all M sources. The significant ambiguities arising in the single frequency, i.e., narrowband, case manifest themselves for different locations at different frequencies. The joint sparsity model exploits these differences to resolve these ambiguities and localize the sources. However full system inversion to recover the source signal, and not just its support, is not always possible unless all individual matrices $A(\omega)$ are invertible over the recovered support set or there is prior information or a model on the sources.

Effect of the Invention

The invention uses a sparse recovery method to localize sources in reverberant environments. A joint-sparsity formulation in a frequency domain can properly account for the reverberation. Thus, many more sources than sensors can be accurately located.

In contrast to conventional wisdom, the invention demonstrates that reverberation, when it is accurately known and properly exploited, helps rather than hinders the localizations.

The invention uses a sparse model to improve source localization in broadband reverberant environments. A model-based sparsity-enforcing method enables the invention to model reverberant characteristics of the environment.

The method operates in the frequency domain, taking into account the frequency response of the environment and, accordingly, formulating a separate narrowband localization problem at each frequency. To ensure that all problems share information and provide a consistent localization output, we enforce a joint-sparsity constraint across the problems. The model is enhanced by using a source location model, which takes into account fundamental localization ambiguities.

In contrast to conventional wisdom, reverberation can be beneficial in source localization, as long as it known and properly accounted for. Prior art localization methods do not assume knowledge on reverberation conditions, but consider reverberation effects a distortion to be accounted for. Thus, the performance of those methods decreases as reverberation time and intensity increases.

Instead, the invented method demonstrates that, when the reverberation is known to some degree of accuracy, it can be beneficial if properly exploited, and actually improve the performance of the localization.

It is to be understood that various other applications and modifications can be made within the spirit and scope of the invention. Therefore, it is the object of the appended claims to cover all such variations and modifications as come within the true spirit and scope of the invention.

We claim:

1. A method for processing source signals, comprising the steps of:
   emitted, by a set of sources at different locations in a reverberant environment, the source signals, wherein the source signals are acoustic signals;
   acquiring, using a set of sensors, input signals corresponding to the source signals, wherein the sensors are microphones and the input signal at each frequency is modeled as a linear combination of all the source signals at that particular frequency, and wherein coefficients in the linear combination correspond to a frequency response of the environment from each location at that frequency; and
   applying a sparsity-based support estimation to the input signals according to a reverberation model to produce estimates of the source signals and the different locations of the set of sources, wherein the applying is performed in a processor.

2. The method of claim 1, wherein the input signals are in a form of discrete Fourier transforms.

3. The method of claim 1, wherein a number of the sources is different than a number of the sensors.

4. The method of claim 1, further comprising:
   discretizing the environment into a grid of locations, wherein each locations is a potential source emitting one of the source signals.

5. The method of claim 4, wherein a number of the sources is less than a number of the locations in the grid.

6. The method of claim 4, further comprising:
   enforcing a model-based truncation to enforce constraints on distances between the locations.

7. The method of claim 1, wherein the input signals are convolutions of the source signals with impulse responses of the environment.

8. The method of claim 1, wherein a number of the sources is unknown.

9. The method of claim 1, wherein a sparsity pattern for all of the frequencies is identical.

10. The method of claim 1, wherein the applying uses a total energy of the input signal at each location for all the frequencies.

11. The method of claim 1, wherein the estimation is a joint-sparsity Compressive Sampling Matching Pursuit (CoSaMP) procedure.

12. The method of claim 1, wherein the estimation is a joint-sparsity greedy procedure.

13. The method of claim 1, wherein the estimation is a joint-sparsity convex procedure.

14. The method of claim 1, further comprising:
   determining a gradient at each frequency according to linear systems derived from frequency transforms of the impulse responses.

15. The method of claim 14, wherein the applying comprises the steps of:
   determining a proxy using the gradients;
   identifying a support candidate using the proxy;
   inverting the linear systems over the support candidate at each frequency;
   determining a final support using an output of the inverting;
   truncating and updating the output of the inverting; and
   iterating until convergence.

16. The method of claim 14 wherein the linear systems are normalized.

* * * * *